United States Patent
Krishnan et al.

(10) Patent No.: US 10,802,121 B1
(45) Date of Patent: Oct. 13, 2020

(54) CLEANING APPARATUS FOR SENSOR

(71) Applicant: Ford Global Technologies, LLC, Dearborn, MI (US)

(72) Inventors: Venkatesh Krishnan, Canton, MI (US); Raghuraman Surineedi, Dearborn, MI (US); Matthew Dennis Smith Boswell, Westland, MI (US); Rashaun Phinisee, Ypsilanti, MI (US); Michael Robertson, Jr., Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/597,011

(22) Filed: Oct. 9, 2019

(51) Int. Cl.
 *G01S 7/497* (2006.01)
 *G01S 17/931* (2020.01)
 *G01S 7/481* (2006.01)

(52) U.S. Cl.
 CPC ............ *G01S 7/497* (2013.01); *G01S 17/931* (2020.01); *G01S 7/4813* (2013.01); *G01S 2007/4975* (2013.01)

(58) Field of Classification Search
 None
 See application file for complete search history.

(56) References Cited

U.S. PATENT DOCUMENTS

| 4,295,200 | A | 10/1981 | Johnson |
| 4,364,088 | A | 12/1982 | Kubota |
| 4,448,526 | A | 5/1984 | Miyazawa |
| 5,546,630 | A * | 8/1996 | Long .................... B60S 1/54 15/250.002 |
| 6,782,793 | B1 | 8/2004 | Lloyd |
| 8,833,566 | B2 | 9/2014 | Ito et al. |
| 9,097,359 | B2 | 8/2015 | Ito et al. |
| 9,114,430 | B2 | 8/2015 | Ito et al. |
| 10,330,205 | B2 | 6/2019 | Michaelsen et al. |
| 10,394,021 | B2 * | 8/2019 | Pahlitzsch ............. G03B 17/56 |
| 2003/0029932 | A1 * | 2/2003 | Nakano .............. F04D 15/0016 239/284.2 |
| 2003/0149505 | A1 * | 8/2003 | Mogensen ........... H05K 3/1275 700/117 |
| 2011/0199485 | A1 * | 8/2011 | Nakamura ........... H04N 5/2252 348/148 |
| 2013/0092758 | A1 * | 4/2013 | Tanaka ...................... B60S 1/52 239/284.1 |
| 2014/0060582 | A1 | 3/2014 | Hartranft et al. |
| 2014/0270379 | A1 * | 9/2014 | Snider ...................... B60R 1/00 382/104 |
| 2015/0040953 | A1 * | 2/2015 | Kikuta ...................... B60S 1/52 134/123 |
| 2015/0138357 | A1 * | 5/2015 | Romack .................. B60R 11/04 348/148 |

(Continued)

*Primary Examiner* — Chico A Foxx
(74) *Attorney, Agent, or Firm* — Frank A. MacKenzie; Bejin Bieneman PLC

(57) ABSTRACT

A sensor apparatus includes a LIDAR sensor, a camera having a field of view encompassing a volume directly forward of the LIDAR sensor, a nozzle aimed at least partially upward and positioned forward of the LIDAR sensor, and a computer programmed to increase output from the nozzle upon determining that an object is traveling rearward through the field of view based on data received from the camera.

16 Claims, 5 Drawing Sheets

(56) References Cited

U.S. PATENT DOCUMENTS

| | | | |
|---|---|---|---|
| 2015/0344001 A1* | 12/2015 | Lopez Galera | B60S 1/56 |
| | | | 134/198 |
| 2016/0101735 A1* | 4/2016 | Trebouet | B60R 11/04 |
| | | | 348/148 |
| 2016/0244028 A1* | 8/2016 | Wakatsuki | B60S 1/62 |
| 2016/0282874 A1* | 9/2016 | Kurata | G05D 1/0088 |
| 2016/0339875 A1* | 11/2016 | Ina | G02B 27/0006 |
| 2017/0036650 A1* | 2/2017 | Hester | B60S 1/52 |
| 2017/0066019 A1 | 3/2017 | Hopman et al. | |
| 2017/0341597 A1* | 11/2017 | Buss | G03B 17/56 |
| 2018/0003958 A1* | 1/2018 | Britton | E21B 47/011 |
| 2018/0009418 A1* | 1/2018 | Newman | B60S 1/0818 |
| 2018/0143298 A1* | 5/2018 | Newman | G06Q 30/0269 |
| 2018/0194330 A1* | 7/2018 | Ichikawa | B60S 1/56 |
| 2018/0264640 A1* | 9/2018 | Holloway | B05B 12/122 |
| 2018/0265048 A1* | 9/2018 | Schmidt | B08B 1/006 |
| 2018/0265049 A1* | 9/2018 | Schmidt | B60S 1/56 |
| 2019/0008345 A1* | 1/2019 | Schmidt | B60R 11/00 |
| 2019/0106085 A1* | 4/2019 | Bacchus | B60S 1/56 |
| 2019/0162951 A1* | 5/2019 | Leonelli, Jr. | B60S 1/482 |
| 2019/0202407 A1* | 7/2019 | Jia | B60S 1/0818 |
| 2019/0202410 A1* | 7/2019 | Zhao | B05B 1/08 |
| 2019/0202411 A1* | 7/2019 | Zhao | B08B 5/02 |
| 2019/0204426 A1* | 7/2019 | Vaishnav | G01S 7/4813 |
| 2019/0283716 A1* | 9/2019 | Sakai | G01S 17/931 |
| 2019/0337489 A1* | 11/2019 | Baldovino | B60S 1/548 |
| 2020/0023814 A1* | 1/2020 | Frederick | B60S 1/481 |
| 2020/0034661 A1* | 1/2020 | Kim | G06N 5/04 |
| 2020/0139939 A1* | 5/2020 | Kubota | G01S 7/497 |

\* cited by examiner

CLEANING APPARATUS FOR SENSOR

BACKGROUND

Vehicles can include a variety of sensors. Some sensors detect internal states of the vehicle, for example, wheel speed, wheel orientation, and engine and transmission values. Some sensors detect the position or orientation of the vehicle, for example, global positioning system (GPS) sensors; accelerometers such as piezo-electric or microelectro-mechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. When sensor lenses, covers, and the like become dirty, smudged, etc., sensor operation can be impaired or precluded.

DETAILED DESCRIPTION

Figure 1:
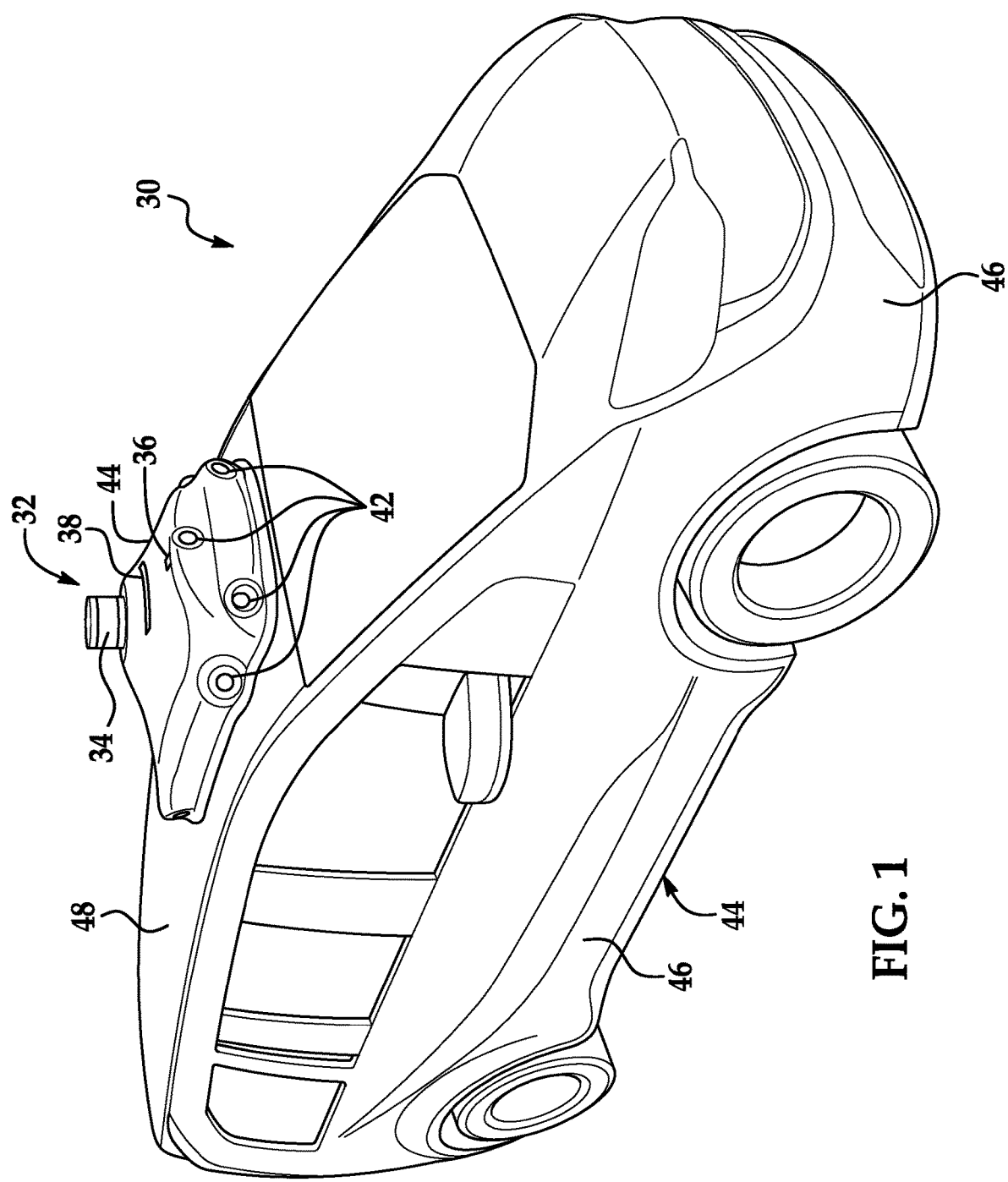
FIG. 1 is a perspective view of an example vehicle with an example sensor apparatus.

A sensor apparatus includes a LIDAR sensor, a camera having a field of view encompassing a volume directly forward of the LIDAR sensor, a nozzle aimed at least partially upward and positioned forward of the LIDAR sensor, and a computer programmed to increase output from the nozzle upon determining that an object is traveling rearward through the field of view based on data received from the camera.

The sensor apparatus may further include a housing to which the LIDAR sensor, the camera, and the nozzle are mounted. The housing may include a chamber, and the nozzle may be fluidly connected to the chamber. The sensor apparatus may further include a pressure source fluidly connected to the chamber, and increasing output from the nozzle may include instructing the pressure source to increase output above a default output. The default output of the pressure source may be greater than zero.

The nozzle may be a first nozzle, and the sensor apparatus may further include a plurality of second nozzles mounted to the housing and positioned to provide an air curtain across the LIDAR sensor. The first nozzle may be at least five times farther from the LIDAR sensor than the second nozzles are.

The housing may include a chamber, and the first nozzle and second nozzles may be fluidly connected to the chamber.

The housing may be contoured to attach to a vehicle roof.

The sensor apparatus may further include a valve controlling flow to the nozzle, and the valve may be switchable between a closed position and an open position. Increasing output from the nozzle may include switching the valve from the closed position to the open position.

The computer may be further programmed to classify the object based on the data received from the camera, and to increase output from the nozzle upon determining that the object is traveling through the volume and that the object is classified as being of a type in a first set of types of object. The computer may be further programmed to refrain from increasing output from the nozzle upon determining that the object is classified as being of a type in a second set of types of object.

The computer may be further programmed to decrease output from the nozzle at a preset time period after increasing output of the nozzle.

The camera may be aimed partially upward and partially forward.

The LIDAR sensor may have a 360° horizontal field of view.

With reference to the Figures, a sensor apparatus 32 for a vehicle 30 includes a LIDAR sensor 34, a camera 36 having a field of view encompassing a volume V directly forward of the LIDAR sensor 34, a first nozzle 38 aimed at least partially upward and positioned forward of the LIDAR sensor 34, and a computer 40 programmed to increase output from the first nozzle 38 upon determining that an object is traveling rearward through the field of view based on data received from the camera 36.

The sensor apparatus 32 can efficiently use resources, e.g., stored electrical power, compressed air, etc., in order to prevent or minimize a risk of debris striking the LIDAR sensor 34. The sensor apparatus 32 can operate the first nozzle 38 when data from the camera 36 indicates that the first nozzle 38 could prevent debris from striking, and can conserve resources by not operating the first nozzle 38 or operating the first nozzle 38 at a lower level when the data indicates that the first nozzle 38 is not useful.

With reference to FIG. 1, the vehicle 30 may be any passenger or commercial automobile such as a car, a truck, a sport utility vehicle, a crossover, a van, a minivan, a taxi, a bus, etc.

The vehicle 30 may be an autonomous vehicle. A vehicle computer can be programmed to operate the vehicle 30 independently of the intervention of a human driver, completely or to a lesser degree. The vehicle computer may be programmed to operate a propulsion, brake system, steering, and/or other vehicle systems based at least in part on data received from the LIDAR sensor 34 described below, as well as other sensors 42. For the purposes of this disclosure, autonomous operation means the vehicle computer controls the propulsion, brake system, and steering without input from a human driver; semi-autonomous operation means the vehicle computer controls one or two of the propulsion, brake system, and steering and a human driver controls the remainder; and nonautonomous operation means a human driver controls the propulsion, brake system, and steering.

The vehicle 30 includes a body 44. The vehicle 30 may be of a unibody construction, in which a frame and the body 44 of the vehicle 30 are a single component. The vehicle 30 may, alternatively, be of a body-on-frame construction, in which the frame supports the body 44 that is a separate component from the frame. The frame and body 44 may be formed of any suitable material, for example, steel, aluminum, etc.

The body 44 includes body panels 46 partially defining an exterior of the vehicle 30. The body panels 46 may present a class-A surface, e.g., a finished surface exposed to view by a customer and free of unaesthetic blemishes and defects. The body panels 46 include, e.g., a roof 48, etc.

A housing 50 for the LIDAR sensor 34 and the other sensors 42 is attachable to the vehicle 30, e.g., to one of the body panels 46 of the vehicle 30, e.g., the roof 48. For example, the housing 50 may be shaped to be attachable to the roof 48, e.g., may have a shape matching a contour of the roof 48. The housing 50 may be attached to the roof 48, which can provide the LIDAR sensor 34 and the other sensors 42 with an unobstructed field of view of an area around the vehicle 30. The housing 50 may be formed of, e.g., plastic or metal.

Figure 2:
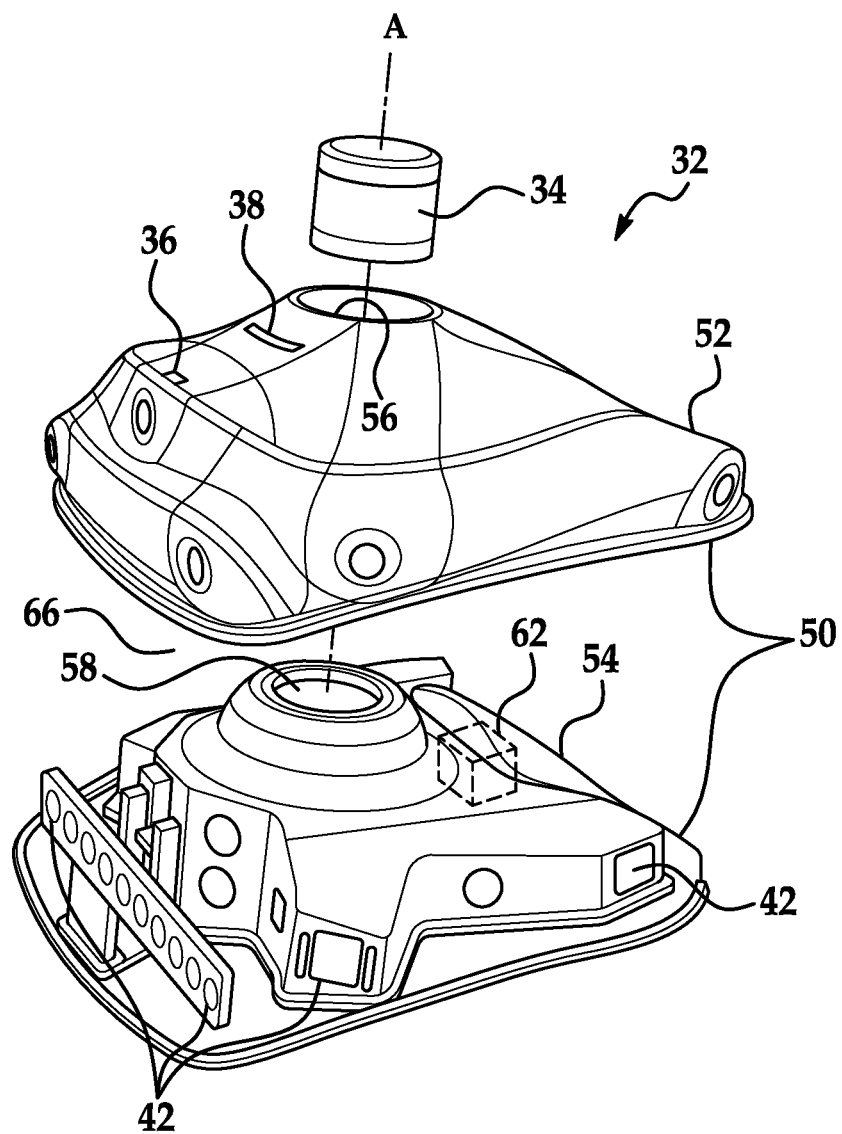
FIG. 2 is an exploded perspective view of the sensor apparatus.

With reference to FIG. 2, the housing 50 includes an upper housing portion 52 and a lower housing portion 54. The upper housing portion 52 and the lower housing portion 54 are shaped to fit together, with the upper housing portion 52 fitting on top of the lower housing portion 54. The upper housing portion 52 covers the lower housing portion 54. The upper housing portion 52 includes a central opening 56 that exposes the lower housing portion 54. The central opening 56 is round, e.g., has a circular or slightly elliptical shape. The upper housing portion 52 and the lower housing portion 54 are each a single piece, i.e., are a continuous piece of material with no internal seams separating multiple pieces. For example, the upper housing portion 52 and the lower housing portion 54 may each be stamped or molded as a single piece.

Figure 3:
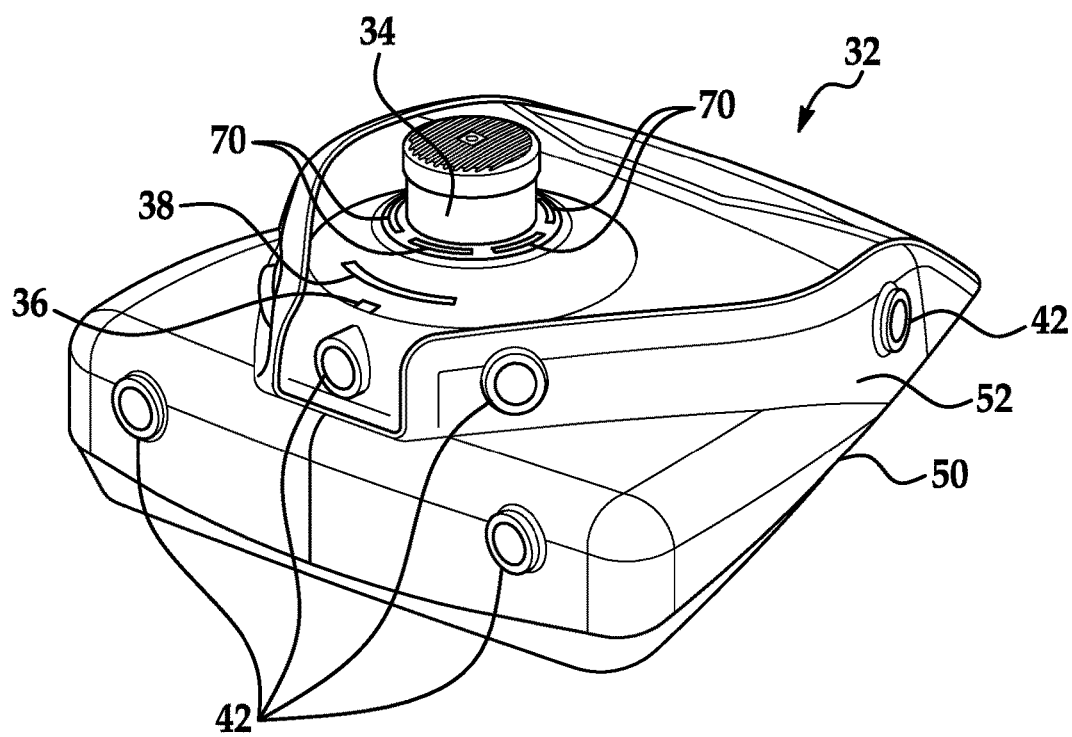
FIG. 3 is a perspective view of the sensor apparatus.

The lower housing portion 54 includes a bracket 58 to which the LIDAR sensor 34 is mounted. The LIDAR sensor 34 is supported by and mounted to the housing 50, specifically typically to the lower housing portion 54. The LIDAR sensor 34 can be disposed on top of the housing 50 at a highest point of the housing 50. The bracket 58 is shaped to accept and fix in place the LIDAR sensor 34, e.g., with a press fit or snap fit. The bracket 58 defines an orientation and position of the LIDAR sensor 34 relative to the body 44 of the vehicle 30. The position of the LIDAR sensor 34 affords the LIDAR sensor 34 a 360° horizontal field of view of the environment surrounding the vehicle 30, as shown in FIG. 3. The LIDAR sensor 34 detects distances to objects by emitting laser pulses at a particular wavelength and measuring the time of flight for the pulse to travel to the object and back.

Figure 4:
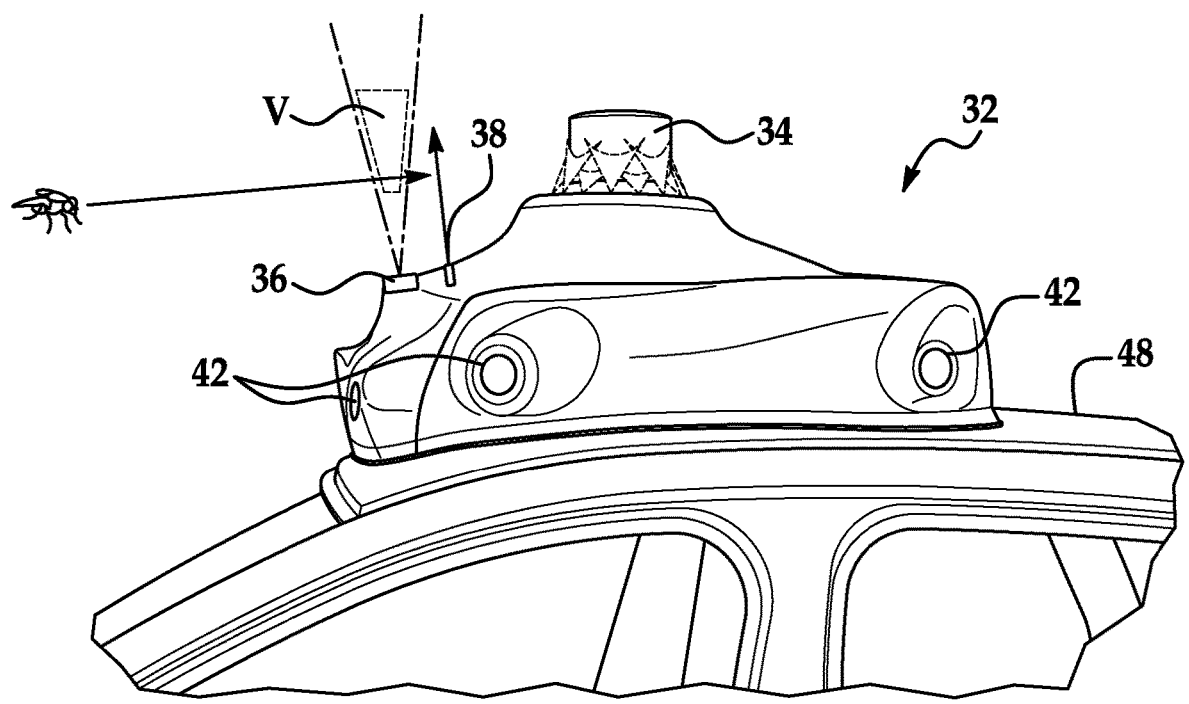
FIG. 4 is a side view of the sensor apparatus.

With reference to FIGS. 3 and 4, the camera 36 is mounted to the housing 50. The camera 36 is disposed farther forward than the LIDAR sensor 34. The camera 36 is aimed partially upward and partially forward, e.g., approximately 45° upward from a vehicle-forward direction. The camera 36 has a field of view encompassing a volume V that is directly forward of the LIDAR sensor 34, i.e., a line starting at a point on the LIDAR sensor 34 and extending in the vehicle-forward direction intersects the volume V. In other words, the volume V is the region of the field of view that is below a top of the LIDAR sensor 34, above a bottom of the LIDAR sensor 34, to the right of a leftmost point of the LIDAR sensor 34, and to the left of a rightmost point of the LIDAR sensor 34.

Figure 5:
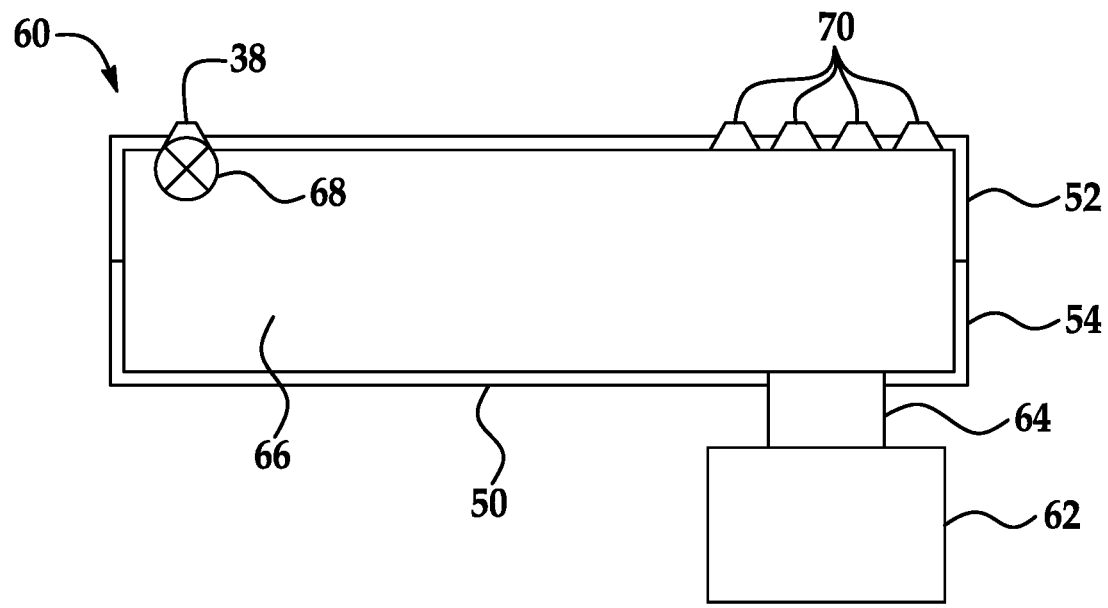
FIG. 5 is a diagram of an example air cleaning system of the sensor apparatus.

With reference to FIG. 5, an air cleaning system 60 includes a pressure source 62, a filter 64, a chamber 66, a valve 68, the first nozzle 38, and second nozzles 70. The pressure source 62, the filter 64, and the first and second nozzles 38, 70 are fluidly connected to each other (i.e., fluid can flow from one to the other) in sequence through the chamber 66.

The pressure source 62 increases the pressure of a gas by, e.g., forcing additional gas into a constant volume. The pressure source 62 may be any suitable type of blower, e.g., a fan, or suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

The filter 64 removes solid particulates such as dust, pollen, mold, dust, and bacteria from air flowing through the filter 64. The filter 64 may be any suitable type of filter, e.g., paper, foam, cotton, stainless steel, oil bath, etc.

The housing 50 includes the chamber 66; in particular, the upper housing portion 52 and the lower housing portion 54 form the chamber 66 by enclosing a space between the upper housing portion 52 and the lower housing portion 54. The pressure source 62 can be positioned to pressurize the chamber 66, i.e., positioned to draw in air from outside the housing 50 and output air into the chamber 66.

The valve 68 controls flow from the chamber 66 to the first nozzle 38. The valve 68 is switchable between a closed position blocking flow from the chamber 66 to the first nozzle 38 and an open position permitting flow from the chamber 66 to the first nozzle 38. The valve 68 can be any suitable type of valve, e.g., a solenoid valve.

The second nozzles 70 are mounted to the housing 50 and positioned to provide an air curtain across the LIDAR sensor 34. The second nozzles 70 are positioned to encircle the LIDAR sensor 34 by extending around the central opening 56. The second nozzles 70 are oriented to discharge vertically upward. A shortest distance from each second nozzle 70 to the LIDAR sensor 34 can be approximately 3 millimeters.

Returning to FIGS. 3 and 4, the first nozzle 38 is mounted to the housing 50, e.g., to the upper housing portion 52. The first nozzle 38 is positioned forward of the LIDAR sensor 34 and rearward from the camera 36. The first nozzle 38 is located at the same position in a cross-vehicle direction as the camera 36 and the LIDAR sensor 34. The first nozzle 38 is aimed at least partially upward, and the first nozzle 38 may be aimed partially forward, partially rearward, or neither, i.e., straight upward. The first nozzle 38 is at least five times farther from the LIDAR sensor 34 than the second nozzles 70 are; i.e., a shortest distance from the LIDAR sensor 34 to the first nozzle 38 is at least five times greater than a shortest distance from the LIDAR sensor 34 to each of the second nozzles 70. For example, a shortest distance from the first nozzle 38 to the LIDAR sensor 34 can be approximately 30 millimeters, approximately ten times greater than the shortest distance from the second nozzles 70 to the LIDAR sensor 34, and the first nozzle 38 and the frontmost of the second nozzles 70 can have approximately a 45° relative angle, e.g., the second nozzle 70 is aimed straight upward and the first nozzle 38 is aimed 45° forward from vertical.

Figure 6:
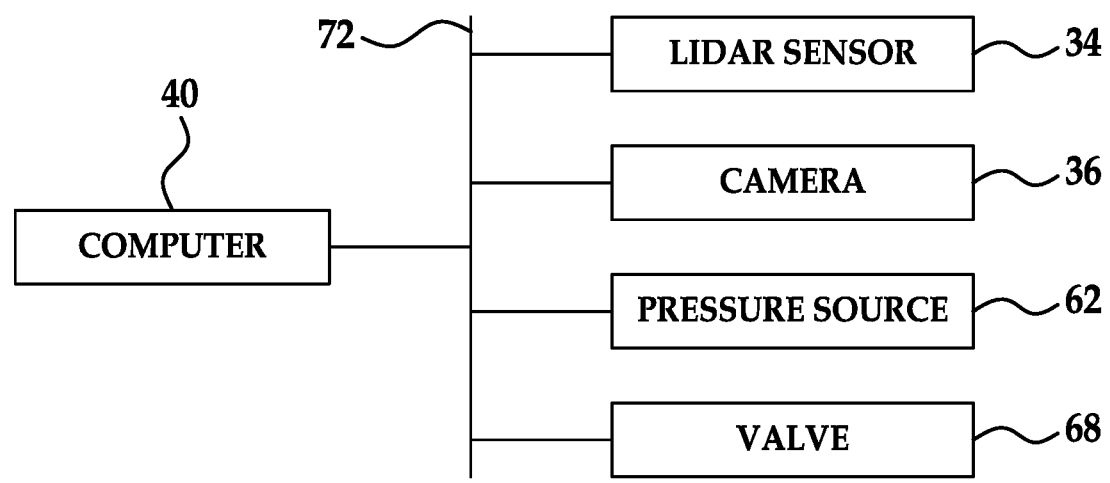
FIG. 6 is a block diagram of an example control system of the sensor apparatus.

With reference to FIG. 6, the computer 40 is a microprocessor-based controller. The computer 40 includes a processor, a memory, etc. The memory of the computer 40 includes media for storing instructions executable by the processor as well as for electronically storing data and/or databases.

The computer 40 may transmit and receive data through a communications network 72 such as a controller area network (CAN) bus, Ethernet, WiFi, Local Interconnect Network (LIN), onboard diagnostics connector (OBD-II), and/or by any other wired or wireless communications network. The computer 40 may be communicatively coupled to the LIDAR sensor 34, the camera 36, the pressure source 62, the valve 68, and other vehicle components and/or systems via the communications network 72.

Figure 7:
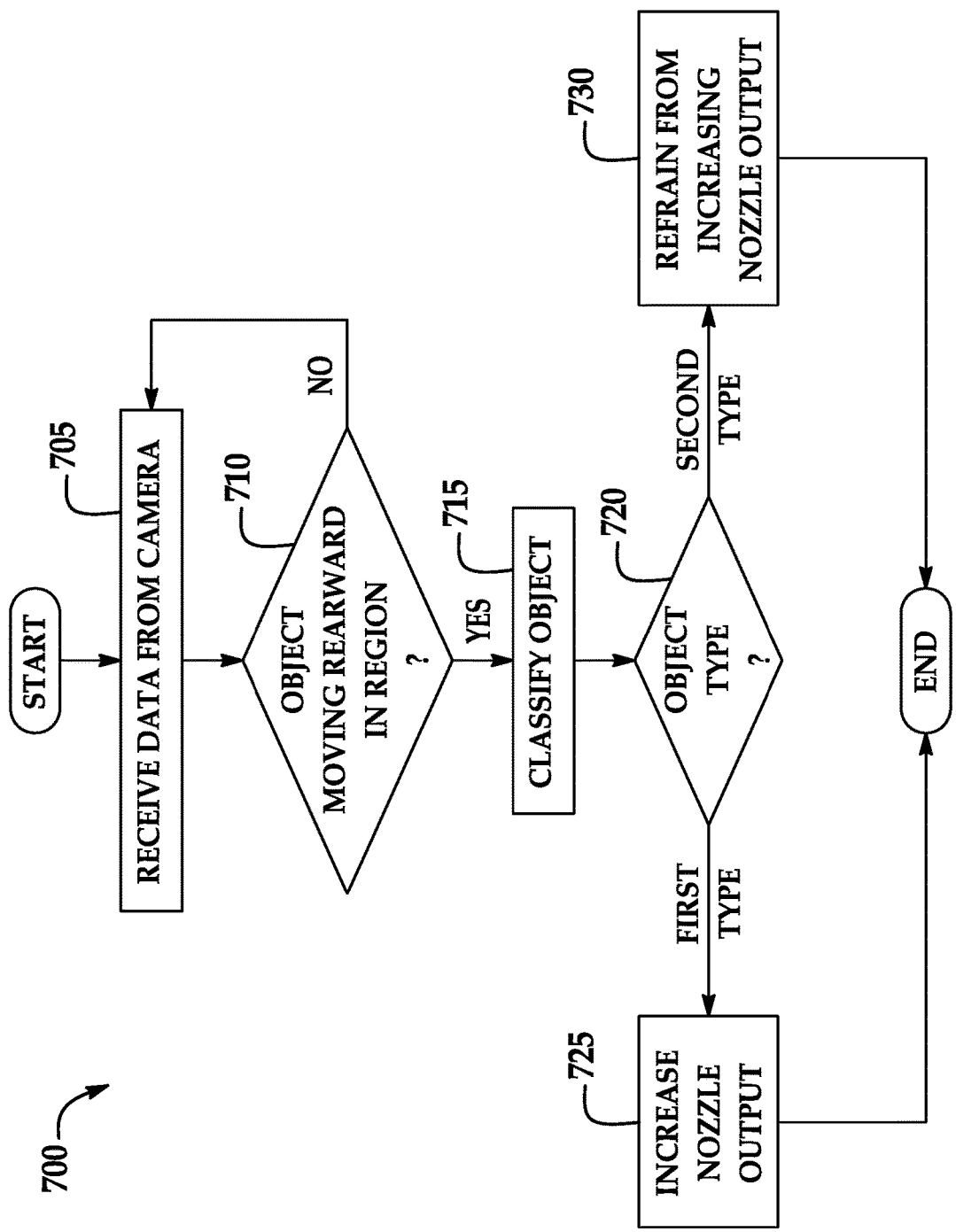
FIG. 7 is a process flow diagram of an example process for controlling the air cleaning system of the sensor apparatus.

FIG. 7 is a process flow diagram illustrating an exemplary process 700 for controlling the air cleaning system 60 of the sensor apparatus 32. The memory of the computer 40 stores executable instructions for performing the steps of the process 700. As a general overview of the process 700, the computer 40 increases output from the first nozzle 38 upon determining that an object is traveling rearward through the field of view based on data received from the camera 36 and upon determining that the object is classified as a first type of object.

The process 700 begins in a block 705, in which the computer 40 receives image data from the camera 36 through the communications network 72. The data are a sequence of image frames of the field of view of each of the camera 36. Each image frame is a two-dimensional matrix of pixels. Each pixel has a brightness or color represented as one or more numerical values, depending on the type of the camera 36. For example, if the camera 36 is a monochrome camera, each pixel can be a scalar unitless value of photometric light intensity between 0 (black) and 1 (white). For another example, if the camera 36 is a full-color camera, the pixels can be values for each of red, green, and blue, e.g., each on an 8-bit scale (0 to 255) or a 12- or 16-bit scale. Position in an image frame, i.e., position in the field of view of the camera 36 at the time that the image frame was recorded, can be specified in pixel dimensions or coordinates, e.g., an ordered pair of pixel distances, such as a number of pixels from a top edge and a number of pixels from a left edge of the field of view. Alternatively, the data from the camera 36 can be event-based vision, in which each pixel records independently of the other pixels when that pixel senses motion, thus recording more extensively about portions of the field of view experiencing change and recording less about portions of the field of view remaining static.

Next, in a decision block 710, the computer 40 determines whether an object is traveling rearward through the field of view based on the image data received from the camera 36. For example, the computer 40 may determine, e.g., according to known image-analysis techniques, that a set of pixels in image data received from the camera 36 fits criteria such as compactness and difference in color from a background color (i.e., the color of the sky) and is therefore an object, and that in successive images the set of pixels corresponding to the object is in different positions (represented as pixel dimensions) that correspond to rearward motion relative to the vehicle 30. Other algorithms may be used, e.g., classical computer vision or machine learning algorithms such as convolutional neural networks. This analysis can be restricted to a subset of the field of view that corresponds to the volume V. Upon determining that an object is traveling rearward through the field of view, the process 700 proceeds to a block 715. If the computer 40 does not find an object traveling rearward through the field of view, the process 700 returns to the block 705 to continue monitoring data from the camera 36.

In the block 715, the computer 40 classifies the object, i.e., identifies a type of the object, based on the data received from the camera 36. In this context, a type of object means a category of physical thing to which the object belongs, e.g., insects, trash, rocks, airplanes, streetlights, pedestrians, etc., are types of objects. The computer 40 can identify the type of object using conventional image-recognition techniques, e.g., a convolutional neural network trained and programmed to accept images as input and output an identified type of object. The types of objects can include, A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential type of object, and the final output is the type of object with the highest score.

Next, in a decision block 720, the computer 40 determines whether the object is a first set of types or a second set of types. For example, the computer 40 can store a lookup table or the like specifying the first set of types and the second set of types. The first set of types of objects includes types of objects that the first nozzle 38 can effectively deflect from striking the LIDAR sensor 34, e.g., insects, trash, rocks, etc. The second set of types of object includes types of objects for which the first nozzle 38 would likely be ineffective and/or is much farther away from the vehicle 30, e.g., airplanes, streetlights, etc. The computer 40 can determine that an object is a first type or second type by determining whether the type of object from the block 715 is included in the first set of types or the second set of types. If the object is classified as being in the first set of types (i.e., is listed as an object of a type that can be effectively deflected from striking the LIDAR sensor 34 by the first nozzle 38), the process 700 proceeds to a block 725. If the object is classified as the second set of types (i.e., is listed as an object of a type that cannot be effectively deflected from striking the LIDAR sensor 34 by the first nozzle 38 and/or is distant), the process 700 proceeds to a block 730.

In the block 725, the computer 40 increases output from the first nozzle 38 for a preset time period. Increasing output from the first nozzle 38 can include instructing the pressure source 62 to increase output above a default output, instructing the valve 68 to switch from the closed position to the open position, or both. The default output of the pressure source 62 can be greater than zero. In other words, the pressure source 62 can be constantly running at a default output, which keeps the chamber 66 pressurized at a super-atmospheric pressure and causes the second nozzles 70 to blow across the LIDAR sensor 34, potentially removing debris from the LIDAR sensor 34. The computer 40 thus increases the output by instructing the pressure source 62 to increase output above the default output, raising the pressure of the chamber 66 above the default super-atmospheric pressure. Alternatively or additionally, the computer 40 can instruct the valve 68 to switch from the closed position to the open position, which increases output from the first nozzle 38 from zero to a positive output. At the preset time period after increasing the output of the first nozzle 38, the computer 40 decreases the output from the first nozzle 38 back to a default quantity. The computer 40 can instruct the pressure source 62 to resume operating at the default output. Alternatively or additionally, the computer 40 can instruct the valve 68 to switch from the open position back to the closed position. The preset time period can be chosen to be sufficiently long to deflect an object in the volume V from striking the LIDAR sensor 34, based on experimental data from testing different types of objects at different vehicle speeds. After the block 725, the process 700 ends.

In the block 730, the computer 40 refrains from increasing output from the first nozzle 38. The computer 40 keeps the pressure source 62 operating at the default output, and/or the computer 40 keeps the valve 68 at the closed position. After the block 730, the process 700 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Terms such as "front," "forward," "back," "rearward," "left," "right," "lateral," etc., are understood relative to the vehicle 30.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A sensor apparatus comprising:
a LIDAR sensor;
a camera having a field of view encompassing a volume directly forward of the LIDAR sensor;
a nozzle aimed at least partially upward and positioned forward of the LIDAR sensor; and
a computer programmed to increase output from the nozzle upon determining that an object is traveling rearward through the field of view relative to the LIDAR sensor based on data received from the camera.

2. The sensor apparatus of claim 1, further comprising a housing to which the LIDAR sensor, the camera, and the nozzle are mounted.

3. The sensor apparatus of claim 2, wherein the housing includes a chamber, and the nozzle is fluidly connected to the chamber.

4. The sensor apparatus of claim 3, further comprising a pressure source fluidly connected to the chamber, wherein increasing output from the nozzle includes instructing the pressure source to increase output above a default output.

5. The sensor apparatus of claim 4, wherein the default output of the pressure source is greater than zero.

6. The sensor apparatus of claim 2, wherein the nozzle is a first nozzle, the sensor apparatus further comprising a plurality of second nozzles mounted to the housing and positioned to provide an air curtain across the LIDAR sensor.

7. The sensor apparatus of claim 6, wherein the first nozzle is at least five times farther from the LIDAR sensor than the second nozzles are.

8. The sensor apparatus of claim 6, wherein the housing includes a chamber, and the first nozzle and second nozzles are fluidly connected to the chamber.

9. The sensor apparatus of claim 2, wherein the housing is contoured to attach to a vehicle roof.

10. The sensor apparatus of claim 1, further comprising a valve controlling flow to the nozzle, wherein the valve is switchable between a closed position and an open position.

11. The sensor apparatus of claim 10, wherein increasing output from the nozzle includes switching the valve from the closed position to the open position.

12. The sensor apparatus of claim 1, wherein the computer is further programmed to classify the object based on the data received from the camera, and to increase output from the nozzle upon determining that the object is traveling through the volume and that the object is classified as being of a type in a first set of types of object.

13. The sensor apparatus of claim 12, wherein the computer is further programmed to refrain from increasing output from the nozzle upon determining that the object is classified as being of a type in a second set of types of object.

14. The sensor apparatus of claim 1, wherein the computer is further programmed to decrease output from the nozzle at a preset time period after increasing output of the nozzle.

15. The sensor apparatus of claim 1, wherein the camera is aimed partially upward and partially forward.

16. The sensor apparatus of claim 1, wherein the LIDAR sensor has a 360° horizontal field of view.

* * * * *